June 26, 1923.

R. B. WILLIAMSON

LUBRICATING APPARATUS

Filed May 8, 1922

Inventor
R. B. Williamson
by
Attorney

Patented June 26, 1923.

1,460,353

UNITED STATES PATENT OFFICE.

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

LUBRICATING APPARATUS.

Application filed May 8, 1922. Serial No. 559,152.

*To all whom it may concern:*

Be it known that ROBERT B. WILLIAMSON, a citizen of the United States, residing at Milwaukee, in the county of Milwaukee and State of Wisconsin, has invented a certain new and useful Improvement in Lubricating Apparatus, of which the following is a specification.

This invention relates in general to lubrication and devices therefor, and has particular relation to the lubrication of rotating machines, especially of the vertical type, wherein a continuous and copious supply of lubricating material is desired for the bearing surfaces.

The invention includes the provision of lubricating devices of an extremely simple character and utilizing the viscosity of the lubricating material as an element of the operation of apparatus for pumping or forcing the lubricating material, this apparatus being capable of putting the lubricating material under the required pressure to insure a desired supply of lubricating material during the operation of a vertical machine, and this forcing or pumping apparatus being of such a character as to be capable of being readily incorporated as a part of the assembled machine.

It is an object of this invention to provide an extremely simple and efficient automatic lubricating system for a rotating machine and embodying the utilization of the viscosity of the lubricating material.

It is a further object of this invention to provide an extremely simple and efficient automatic lubricating system for a rotating machine and including a pumping device of improved design and construction utilizing the viscosity of the lubricating material and so associated with the parts of the machine as to be readily included therewith as a component part of the machine.

It is a further object of this invention to provide an extremely simple and efficient pumping device of utility in an automatic lubricating system for a rotating machine and embodying parts capable of direct association with the rotatable element of the machine and capable of developing the desired capacity through utilization of the viscosity of the oil, this pump being of such design and character as to readily permit developing pressure in several stages.

It is a further object of this invention to provide a rotating machine of the vertical type with an extremely simple and efficient automatic lubricating system including a pump or forcing device directly associated with the rotating element of the machine and of such a character as to utilize the viscosity of the lubricating material, the pump being so disposed on the machine as to receive lubricating material which has passed from a bearing and being effective to return this lubricating material to the upper side of one or more bearings.

These and other objects and advantages are attained by this invention, the various novel features of which will be apparent from the description and drawings, disclosing one embodiment of the invention, and will be more particularly pointed out in the claims.

Figures 1, 2:
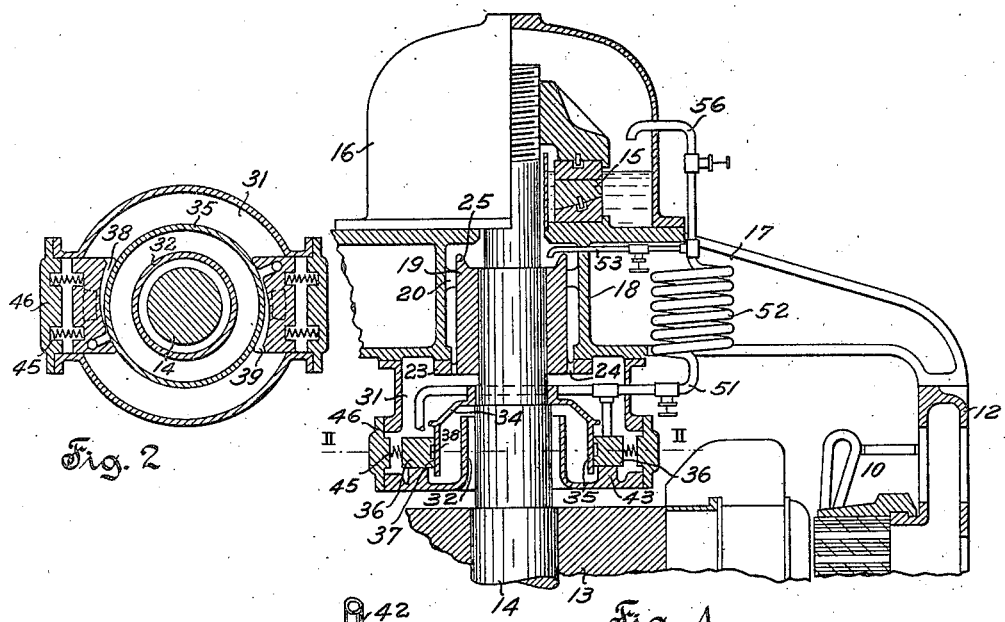
Figure 1 is a fragmental sectional elevation of a dynamo-electric machine provided with lubricating devices embodying features of the present invention.
Figure 2 is a horizontal sectional view in the plane of the line II—II of Fig. 1.

As disclosed in Figures 1 and 2, a dynamo-electric machine, of the vertical shaft type, includes a stator 10, here shown in the form of the stationary armature of an alternating current generator, the stator core being mounted in a supporting frame 12. The rotor 13, shown as the rotating field of the generator, is suitably mounted upon the vertical shaft 14. The weight of the shaft and the rotating parts carried thereby is supported on a thrust bearing 15 which is enclosed within a bearing housing 16 and carried upon a supporting frame 17 which is supported upon the stator frame 12, and may be in the form of a central hub and spaced arms radiating therefrom.

Integral with the hub portion of the frame 17 is a housing 18 for a guide bearing which includes a sleeve 19 whose inner side constitutes a bearing surface for co-operation with the shaft 14, and whose outer side bears against spaced ribs 20 at the inner side of the housing 18. The sleeve 19 has an integral annular projection 23 at its lower side through which the sleeve is supported in position within the housing 18, as by means of bolts or screws passing through this annular projection and the lower part of the bearing housing. The spaces between the ribs 20 may communicate with the lower side of the bearing sleeve through ports or passages 24. The upper end of the bearing sleeve 19 is provided with an annular rib or projection 25 which constitutes a dam or pocket for holding a quantity of lubricating material to be supplied to the engaging surfaces of the shaft and the bearing sleeve.

If the generator is driven by a hydraulic turbine or other prime mover located below the generator, one or more additional guide bearings may be disposed beneath the generator. During operation of the machine, it is necessary that oil be continually supplied to the upper end of the guide bearing so that the oil may be drawn or forced in small quantities downwardly between the engaging surfaces of the shaft and the bearing sleeve so as to maintain these parts in a properly lubricated and cool running condition. In the ordinary construction after leaving the bearing, this oil follows along the shaft to a deflector or slinger whence it is thrown into a collecting chamber or reservoir which may be connected to an external pumping system.

As shown herein, a reservoir 31 is mounted in position immediately below the guide bearing 19, preferably by bolting a flange at the upper edge of the reservoir to the under side of the hub portion of the frame 17 or to the bearing housing 18. This reservoir 31 has associated with its lower side adjacent the shaft 14, an upwardly extending sleeve 32 constituting a dam. An oil deflector or slinger 34, preferably in a plurality of detachable sections, is mounted on the shaft below the guide bearing 19. This deflector has an inclined portion and an annular extension 35 projecting downwardly therefrom. The outer surface of this extension 35 is machined so as to be concentric with the shaft. During ordinary operation, oil following along the shaft is thrown outwardly, due to centrifugal force, from the inclined surface of the deflector 34 and is collected in the body of the reservoir. To facilitate removal and replacing of the reservoir, it is preferably made in a plurality of sections secured together in a fluid tight manner.

One or more blocks or casing elements 36 are disposed within the reservoir 31 below the normal oil level therein and having their radially inner surfaces machined concentric with the shaft and the outer surface of the extension 35. The radially inner side of each of the blocks 36 is provided with a circumferentially extending groove 38 of tapering cross-section, the greatest cross-sectional area being adjacent the forward or leading edge of the block, that is, considered with respect to the rotating shaft and extension 35. This forward or leading edge of the groove may be further enlarged by beveling one or more of the walls of the groove, as indicated at 39. The bottom or inner side of the groove at the rear end thereof gradually approaches to coincidence with the general surface of the inner side of the block, and at this point there is a port or passage 41 communicating with the groove and a discharge pipe 42.

As indicated, the blocks 36 may be held in position supported upon projections 43 on the bottom of the reservoir, and the blocks may be pressed radially inward so as to bring the inner surface thereof into close engagement with the outer surface of the annular extension 35 of the deflector by means of one or more springs 45, the latter being here shown as being positioned and mounted in recesses in the block and a removable closure 46 in the side wall of the reservoir.

It will be apparent that other means may be provided for supporting the blocks 36 in operative position, such as rods or pins attached to either the block or the closure 46 of the reservoir and slidable in recesses in the other one of these members. As before, springs may surround these pins or rods and exert their function of urging the blocks into co-operative engagement with the outer surface of the extension 35. The preferred and most desirable construction is one in which the openings in the wall of the reservoir covered by the closures 46, are of sufficient size to permit the ready insertion and removal of the blocks 36 therethrough.

In the operation of the machine, oil is fed to the space within the annular projection 25 at the upper side of the guide bearing, whence it is drawn or forced downwardly between the co-operating surfaces of the shaft and bearing sleeve and is thrown outwardly by the slinger or deflector 34 into the reservoir 31. Any excess of oil, beyond what may normally pass downwardly between the engaging surfaces of the shaft and bearing sleeve, passes over the upper edge of the dam or projection 25 and downwardly in the spaces between the ribs 20 and through the ports 24, whence it passes to the deflector 34 and is thrown outwardly into the reservoir 31.

Due to the fact that the material ordinarily used for lubricating machines of this character has a considerable degree of viscosity, particles or films of the oil adhere to the outer surface of the annular extension 35 during its rotation through the body of oil in the reservoir, and this adhering oil, and other adjacent strata of oil having a revolving motion due to rotation of the shaft and the part 35, are drawn or forced into the open mouth 39 of the tapered groove 38 at the inner side of the bearing block 36. The pressure accumulated on the oil drawn into this groove increases as the cross section of the groove decreases and, hence, this pressure is greatest at the inner shallow end of the groove adjacent the discharge port 41. The rotating annular extension 35 causes this oil to be forced through the groove 38 and discharged therefrom through the port 41 and the discharge pipe 42, whence it may be passed through a valved pipe connection 51 and a cooling coil 52, to a valved discharge pipe 53 which communicates directly with the space within the annular projection 25 at the upper end of the guide bearing. This cooling coil, here shown as being supported on the frame 17, is preferably in such position as to be subjected to currents of cooling or ventilating air or other fluid.

The amount of oil pumped or discharged from the reservoir 31, and in an inverse manner, the pressure under which the oil is pumped, may be varied by throttling the discharge.

If desired, an extension 56 of the pipe connection 53 may be passed into the housing 16 of the thrust bearing 15 to supply lubricating material thereto. In case a continuous supply of oil is fed to the thrust bearing housing, the inner sleeve dam of the thrust bearing which ordinarily surrounds the shaft may act as an overflow, although it is preferable to provide a separate overflow outside the co-operative bearing parts, at a point appreciably above the co-operating bearing surfaces of the thrust bearing, in any case this overflow communicating with the space within the upper edge of the guide bearing.

Figures 3, 4:
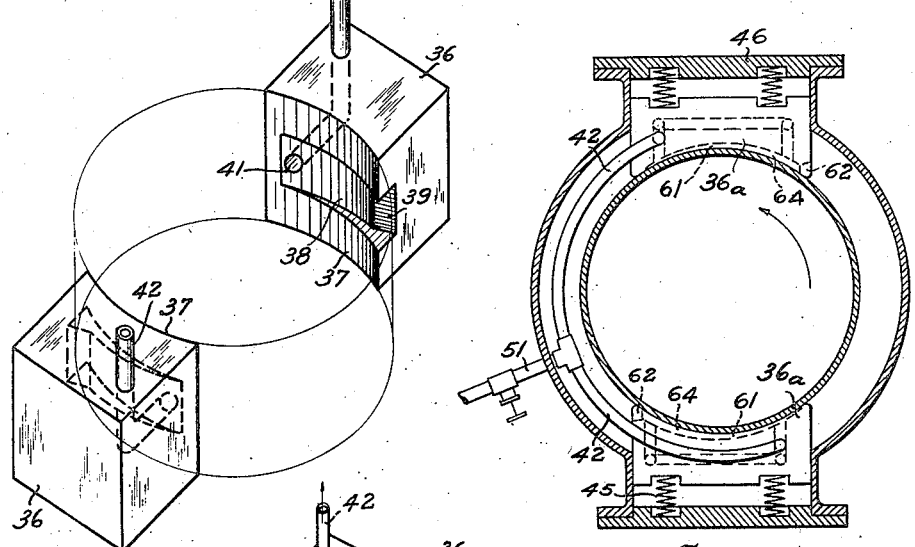
Figure 3 is a view in perspective disclosing details of the lubricating device of Fig. 1.
Figure 4 is an enlarged horizontal section showing a modification of the lubricating device of Fig. 1.

As indicated in Figs. 1, 2 and 3, a plurality of pumping devices 36 are associated with the annular extension 35 of the deflector, these devices being disposed 180 degrees apart, so as to exert a maximum effect in balancing any side thrust on the deflector or the shaft. As indicated, the discharge pipes 42 from both blocks 36 are connected to the pipe 51.

Figure 5:
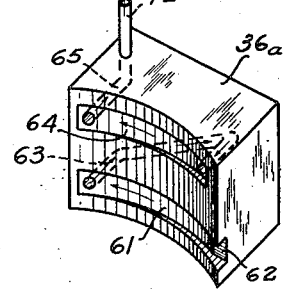
Figure 5 is a view in perspective of a detail of the lubricating device of Fig. 4.

As indicated in Figures 4 and 5, the pump block 36ª is provided with a plurality of tapered grooves connected in series. The lower groove 61 is similar in shape and general characteristics and the effects present during operation, to the groove 38 of the block 36 of Figs. 1, 2 and 3. The discharge port 63 connected to the inner shallow end of the groove 61 communicates with the forward and deeper end of the groove 64, this groove being closed at its forward end and receiving a supply of oil during operation only through the communicating port 63. The inner shallow end of the groove 64 communicates through a port 65 with the discharge pipe 42 of the block. With this arrangement, it will be apparent that oil is forced through the groove 61 where pressure is accumulated thereon, the oil under pressure then passing to the forward end of the groove 64, where additional pressure is accumulated and from which it is discharged through the port 65 and the discharge pipe 42 to the conduit 51.

As indicated in Fig. 4, two similar blocks or casings 36ª each of which have two pumping portions connected in series, are provided, the discharge pipes 42 of the two pump blocks being connected to a common discharge 51. It will be apparent that where two or more stages are used, it is not necessary to have the second or higher stages immersed in the oil in the reservoir.

It will be apparent that any desired arrangement may be provided, that is, as to connection of the pump elements in series or parallel, to provide any required discharge capacity and discharge pressure.

Figure 6:
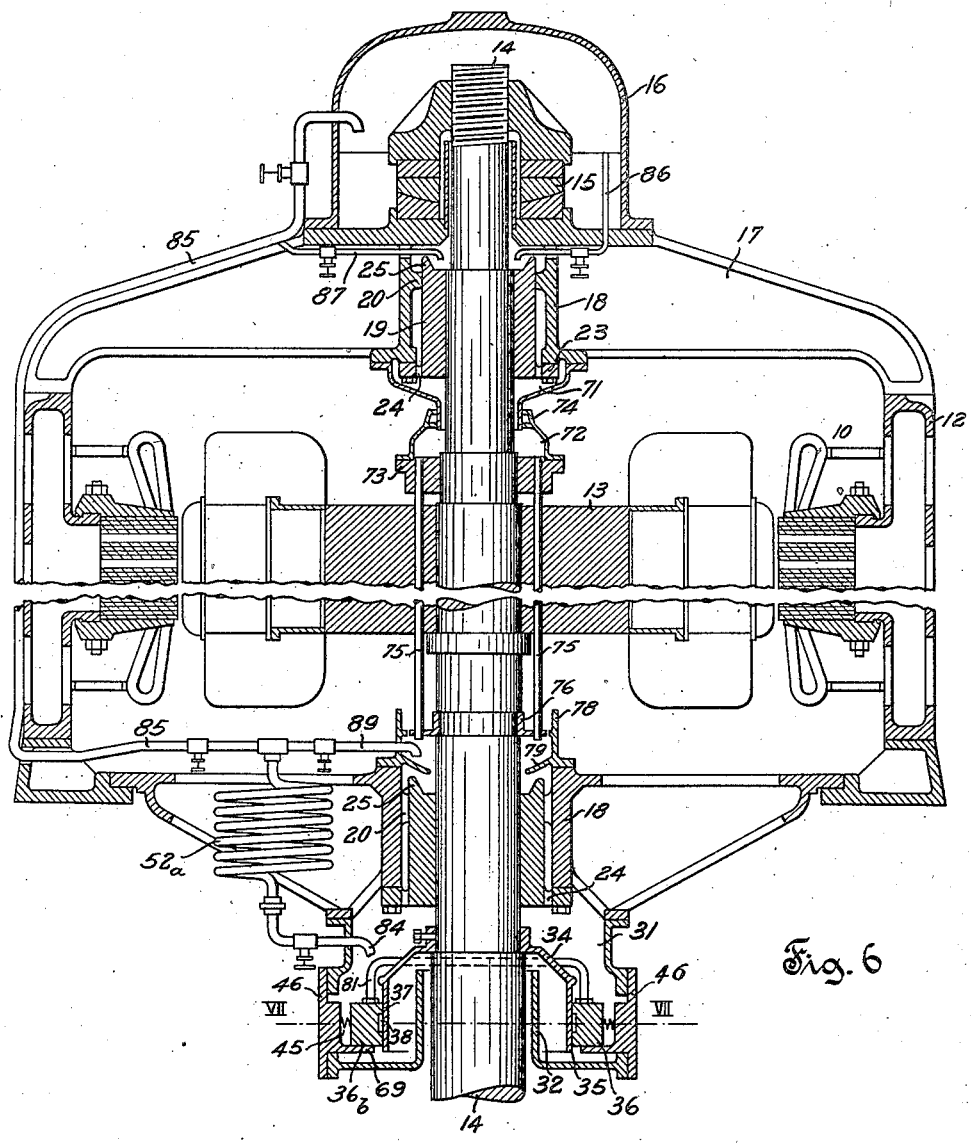
Figure 6 is a sectional elevation of a dynamo-electric machine showing a further embodiment of features of the present invention.
Figure 7:
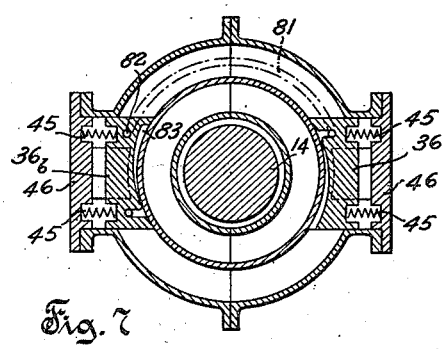
Figure 7 is a horizontal section in the plane of the line VII—VII of Fig. 6.

In Figs. 6 and 7, there is shown a dynamo-electric machine having both upper and lower guide bearings, it being assumed that the machine is driven by a hydraulic turbine located in position below the machine, and that the weight of the shaft and rotating members is carried by a thrust bearing 15 similar in all essential respects to the thrust bearing of the machine shown in Fig. 1. While a separate viscosity pumping device may be associated with the upper guide bearing, as illustrated in Fig. 1, the particular embodiment of the invention shown in Figs. 6 and 7 includes the use of a single pumping device located in position below the lower guide bearing and of such capacity and so arranged as to pump the required volume of oil at the required pressure to insure the efficient lubrication of both the upper and lower guide bearings and also the thrust bearing, if desired. This viscosity pumping device may be considered as involving substantially the same structural elements as the viscosity pump described hereinabove. However, instead of resting on pads integral with the bottom of the reservoir 31, the blocks 36 are supported on shelves 69 carried by the removable closures 46.

Lubricating material which is forced or discharged from the upper guide bearing passes into a sleeve-like chamber 71 secured at its upper end to the frame 17 and contracted at its lower end and telescoping the upper end of a correspondingly shaped chamber 72, a fluid tight packing 74 being preferably associated with the telescoping portions of the members 71 and 72. The element 72 is secured to a block or collar 73 fixed to the shaft, and one or more pipes 75 communicate, through the block 73, with the chamber 72 and are effective to discharge oil therefrom to the lower bearing. The lower ends of the pipes 75 are secured to a collar 76 fixed to the shaft and preferably disposed within a sleeve 78 fixed in position, as by being secured to the upper end of the lower guide bearing housing. This sleeve 78 is preferably provided with a downwardly inclined deflector 79 upon which oil is discharged from the pipes 75 and by means of which this oil is conducted to a point fairly close to the shaft, whence it may pass readily to the space within the projection or lip 25 at the upper side of the sleeve 19 of this lower guide bearing.

As stated above, the viscosity pump associated with the lower guide bearing may be of the same construction as to all essential features, as the pump shown in Fig. 1. However, while each of the pump blocks or casings of Figs. 6 and 7 constitutes a single-stage pump, the two blocks are connected in series so as to constitute, in effect, a two-stage pump, the discharge pipe 42 from the block 36, whose construction is similar to that of the block 36 of Fig. 1, is connected through a pipe 81 and an inlet port 82 to the deeper or inlet end of a groove 83 of the block 36$^b$, this groove being closed at its forward or deeper end.

The discharge pipe 42 of the pump block 36$^b$ is connected to a conduit 84, a cooling coil 52$^a$ being connected between this conduit and a discharge conduit 85 which passes to the upper end of the machine, and at its discharge end communicates with the housing of the thrust bearing 15. An overflow conduit 86 is provided in this bearing housing, the inlet to this overflow being above the co-operative surfaces of the active bearing elements, and leading to the space within the projection 25 at the upper side of the sleeve 19 of the upper guide bearing.

It will be apparent that lubricating material discharged from the pump at the lower side of the machine passes through the cooling coil 52$^a$ which is purposely disposed in position to be most effectively cooled by the ventilating air currents drawn or forced into the machine during its operation. The ordinary construction of a machine of the type shown includes a fan mounted on the rotor, or a special construction of the rotor, which insures drawing a large supply of cooling air from the lower side of and through the machine to effectively cool the same. The cooled lubricating material passes through the discharge pipe 85 to the housing of the thrust bearing 15. The overflow from the thrust bearing housing discharges to the upper guide bearing whence it passes through the sleeve or conduit elements 71 and 72, and the pipes 75 to the upper side of the lower guide bearing. After passing through the lower guide bearing, the oil is thrown from the deflector 34 into the body of the reservoir 31 from which it is recirculated by the viscosity pump made up of the casing elements 36 and 36$^a$ and the co-operating annular extension 35.

If desired, all or any desired portion of the lubricating material required for the upper or lower guide bearing may be fed directly through a valved branch conduit 87 to the space within the projection 25 at the upper side of the upper guide bearing. Under these circumstances, it may be desirable to have the thrust bearing 15 self-cooled to the extent that no oil need be fed thereto through the discharge end of the pipe 85, and the passage through the overflow pipe 86 may be closed off. Further, an additional branch conduit 89 may be provided which may supply all or any desired portion of the lubricating material required for efficient lubrication of the lower guide bearing. In case the full supply of oil for the lower guide bearing is supplied through the branch 89, it is desirable to have a separate pump element associated with the upper bearing to take care of lubrication of this bearing. However, the matter of the number and position of the pumps relatively adjacent the bearings is to a degree a matter of selection, so long as the pump and its reservoir are associated with the shaft in such a manner as to be enabled to receive oil passing from the bearing.

While the above explanation may not be exact as to all the details of the physical effects attending the accumulation of the oil under pressure between the co-operating elements of the pump and its discharge therefrom, nevertheless, it is certain that the apparatus described is operative to produce the highly desirable effects set forth as to discharging large quantities of oil under a substantial and satisfactory pressure.

It should be understood that it is not desired that the invention claimed be limited to the exact details of construction shown and described, for obvious modifications will occur to one skilled in the art.

It is claimed and desired to be secured by Letters Patent:

1. In combination in a vertical shaft machine, a bearing for the shaft, a reservoir secured in position below said bearing and adapted to receive oil from said bearing, a viscosity pump in said reservoir, said pump comprising relatively rotatable and co-operatively engageable parts, one of said parts being rotatable with said shaft in a body of lubricating material in said reservoir, and one of said parts having a recess at its face engageable with the other part, the depth of said recess decreasing from the leading edge thereof, and said recessed part having a discharge port communicating with a portion of said recess of decreased depth, and a conduit connection from said discharge port to the upper side of said bearing.

2. In combination in a vertical shaft machine, a bearing for the shaft, a reservoir secured in position adjacent the lower side of said bearing and adapted to receive oil from said bearing, a viscosity pump in said reservoir, said pump comprising relatively rotatable and co-operatively engageable parts, one of said parts being rotatable with said shaft in a body of lubricating material in said reservoir, and one of said parts having a recess at the face thereof engageable with the other part, the depth of said recess decreasing from the leading edge thereof, said recessed part having a discharge port communicating with a portion of said recess of decreased depth, means for yieldingly urging said relatively rotatable parts into co-operative engagement, and a conduit connection from said discharge port to the upper side of said bearing.

3. In combination in a vertical shaft machine, a bearing for the shaft, a reservoir secured in position adjacent the lower side of said bearing and adapted to receive oil from said bearing, a viscosity pump in said reservoir, said pump comprising a part having a surface portion all points of which are equidistant from the axis of said shaft and rotatable in a body of lubricating material in said reservoir, a stationary part co-operatively engageable with the surface portion of said rotatable part, said stationary part having a recess in its face engageable with said rotatable part and decreasing in depth from the leading edge thereof, and said recessed part having a discharge port communicating with a portion of said recess of decreased depth, and a conduit connection from said discharge port to the upper side of said bearing.

4. In combination in a vertical shaft machine, a bearing for the shaft, a reservoir secured in position adjacent the lower side of said bearing and adapted to receive oil from said bearing, a viscosity pump in said reservoir, said pump comprising a part having its surface concentric with said shaft and rotatable in a body of lubricating material in said reservoir, a stationary part having a portion in co-operative engagement with said rotatable part and having a recess at the face engageable with said rotating part, said recess being of tapering depth which decreases from the leading edge thereof, means for urging said stationary part into co-operative engagement with said rotatable part, said stationary part having a discharge port communicating with a portion of said recess of decreased depth, and a conduit connection from said discharge port to the upper side of said bearing.

5. In combination in a vertical shaft machine, a bearing for the shaft, a reservoir secured in position adjacent the lower side of said bearing and adapted to receive oil from said bearing, a viscosity pump in said reservoir, said pump comprising a part having its outer surface concentric with said shaft and rotatable in a body of lubricating material in said reservoir, a stationary part having a face portion in co-operative engagement with said rotatable part and having a groove of varying depth which decreases from the leading edge thereof, means for yieldingly urging said stationary part into co-operative engagement with said rotatable part, the wall of said reservoir being provided with a removable closure, and said urging means being carried by said removable closure, said stationary part having a discharge port communicating with a portion of said recess of decreased depth and a conduit connection from said discharge port to the upper side of said bearing.

6. In combination in a vertical shaft machine, a bearing for the shaft, a reservoir secured in position adjacent the lower side of said bearing and adapted to receive oil from said bearing, a viscosity pump in said reservoir, said pump comprising a part having an outer surface concentric with said shaft and rotatable in said reservoir, a stationary part having a face portion in co-operative engagement with said rotatable part, said stationary part having a groove in its face portion decreasing in depth from its leading edge, means for yieldingly urging said stationary part into co-operative engagement with said rotatable part, the wall of said reservoir being provided with an opening having a removable closure, and said stationary part being removable through said opening and having a discharge port communicating with a portion of said recess of decreased depth, and a conduit connection from said discharge port to the upper side of said bearing.

7. In combination in a vertical shaft machine, a bearing for the shaft, a reservoir secured in position adjacent the lower side of said bearing and adapted to receive oil from said bearing, a viscosity pump in said reservoir, said pump comprising a part having an outer surface concentric with said shaft and rotatable in a body of lubricating material in said reservoir, a stationary part having a face portion in co-operative engagement with said rotatable part and having a groove in its face portion decreasing in depth from its leading edge, means for yieldingly urging said stationary part into co-operative engagement with said rotatable part, the wall of said reservoir being provided with an opening having a removable closure, and said urging means being carried by said removable closure, said stationary part being removable through said opening and having a discharge port communicating with a portion of said recess of decreased depth, and a conduit connection from said discharge port to the upper side of said bearing.

8. In combination in a rotating machine, means for forcing ventilating fluid through the machine, a bearing for the shaft of said machine, a reservoir secured in position adjacent the lower side of said bearing and adapted to receive oil from said bearing, a viscosity pump in said reservoir, said pump comprising a part rotatable in a body of lubricating material in said reservoir, said part having an outer surface all points of which are equidistant from the axis of rotation of said part, a stationary part co-operatively engageable with said outer surface of said rotatable part and presenting a recess between said stationary and rotatable parts, said recess decreasing in depth from the leading edge thereof, and said stationary part having a discharge port communicating with a portion of said recess of decreased depth, and a conduit connection from said discharge port to the upper side of said bearing, said connection including a radiator disposed in the path of ventilating fluid drawn into said machine and adapted to cool the oil passing to said bearing.

9. In combination in a vertical shaft machine, a bearing for the shaft, a reservoir secured in position adjacent the lower side of said bearing, an oil deflector secured to said shaft below said bearing and adapted to receive oil from said bearing, said deflector being disposed with a surface portion substantially within said reservoir, and a stationary part co-operatively engageable with said surface portion of said deflector and presenting a recess between said stationary part and said deflector, said recess being of decreasing depth from the leading edge thereof and having a discharge communicating with a portion of said recess of decreased depth.

10. In combination in a vertical shaft machine, a bearing for the shaft, a reservoir secured in position adjacent the lower side of said bearing, an oil deflector secured to said shaft below said bearing and adapted to receive oil from said bearing, said deflector being disposed substantially within said reservoir, a stationary part co-operatively engageable with a surface portion of said deflector, said stationary part having a groove in its face engageable with said deflector, said groove being of decreasing depth from the leading edge thereof, and said stationary part having a discharge port communicating with a portion of said recess of decreased depth.

11. In combination in a vertical shaft machine, a bearing for the shaft, a reservoir secured in position adjacent the lower side of said bearing, an oil deflector secured to said shaft below said bearing and adapted to receive oil therefrom, said deflector being disposed substantially within said reservoir, a stationary part having its face co-operatively engageable with a portion of said deflector concentric with said shaft and provided with a groove in said face, said groove being open at its leading edge and decreasing in depth therefrom, means for urging said stationary part into co-operative engagement with said deflector, said stationary part having a discharge port communicating with a portion of said recess of decreased depth, and a conduit connection from said discharge port to the upper side of said bearing.

12. In combination in a vertical shaft machine, a bearing for the shaft, a reservoir secured in position adjacent the lower side of said bearing, an oil deflector secured to said shaft below said bearing and adapted to receive oil from said bearing, said deflector being disposed substantially within said reservoir, a stationary part co-operatively engageable with a surface portion of said deflector and presenting a recess between said stationary part and said deflector, said recess being open at its leading edge and of decreasing depth therefrom, and said stationary part having a discharge port communicating with a portion of said recess of decreased depth, and means for resiliently urging said stationary part into co-operative engagement with said deflector, the wall of said reservoir having an opening provided with a removable closure, and said urging means being carried by said removable closure.

13. In combination in a vertical shaft machine, a bearing for the shaft, a reservoir secured in position adjacent the lower side of said bearing, an oil deflector secured to said shaft below said bearing and adapted to receive oil therefrom, said deflector having a downwardly extending flange at its outer edge disposed substantially within said reservoir, a stationary part having its face co-operatively engageable with the flange on said deflector and provided with a groove in said face, said groove being open at its leading edge and decreasing in depth therefrom, said stationary part having a discharge port communicating with a portion of said recess of decreased depth, means for yieldingly urging said stationary part into co-operative engagement with said deflector, and a conduit connection from said discharge port to the upper side of said bearing.

14. In combination, a rotatable shaft machine, a bearing for said shaft, a reservoir adjacent said bearing and adapted to receive oil therefrom, a viscosity pump in said reservoir, said pump comprising a part having a surface portion all points of which are equidistant from the axis of said shaft and rotatable with said shaft in said reservoir, a stationary part co-operatively engageable with said surface portion of said rotatable part, and means for urging said stationary part into co-operative engagement with said rotatable part, said stationary part having a plurality of circumferentially extending recesses in the face thereof engageable with said rotatable part and decreasing in depth from the leading edge thereof, one of said recesses being open at its leading edge and adapted to receive oil from said reservoir, and a second recess having its leading edge closed and connected to the shallow end of said first recess, and said stationary part having a discharge port communicating with the shallow end of said second recess.

15. In combination, a rotatable shaft, a bearing for said shaft, a reservoir adjacent the lower side of said bearing and adapted to receive oil therefrom, a viscosity pump in said reservoir, said pump comprising a part having a surface portion all points of which are equidistant from the axis of said shaft and rotatable with said shaft in said reservoir, a plurality of stationary parts co-operatively engageable with said surface portion of said rotatable part, each of said stationary parts being provided with a groove in the face thereof engageable with said rotatable part, said grooves decreasing in depth from the leading edge thereof, and one of said grooves being open at its leading edge and adapted to receive oil from said reservoir and having a discharge adjacent its portion of minimum depth, means for providing fluid communication between said discharge and the leading edge of the groove in a second one of said stationary parts, the groove in said latter part being closed at its leading edge and having a discharge port at a portion of decreased depth, means for urging said stationary parts into engagement with said rotatable parts, and a conduit connection from said discharge port to the upper side of said bearing.

In testimony whereof, the signature of the inventor is affixed hereto.

ROBERT B. WILLIAMSON.